Oct. 2, 1928.
J. A. WRIGHT
1,686,195
SPRING SUSPENSION
Filed Dec. 22, 1926
3 Sheets-Sheet 1
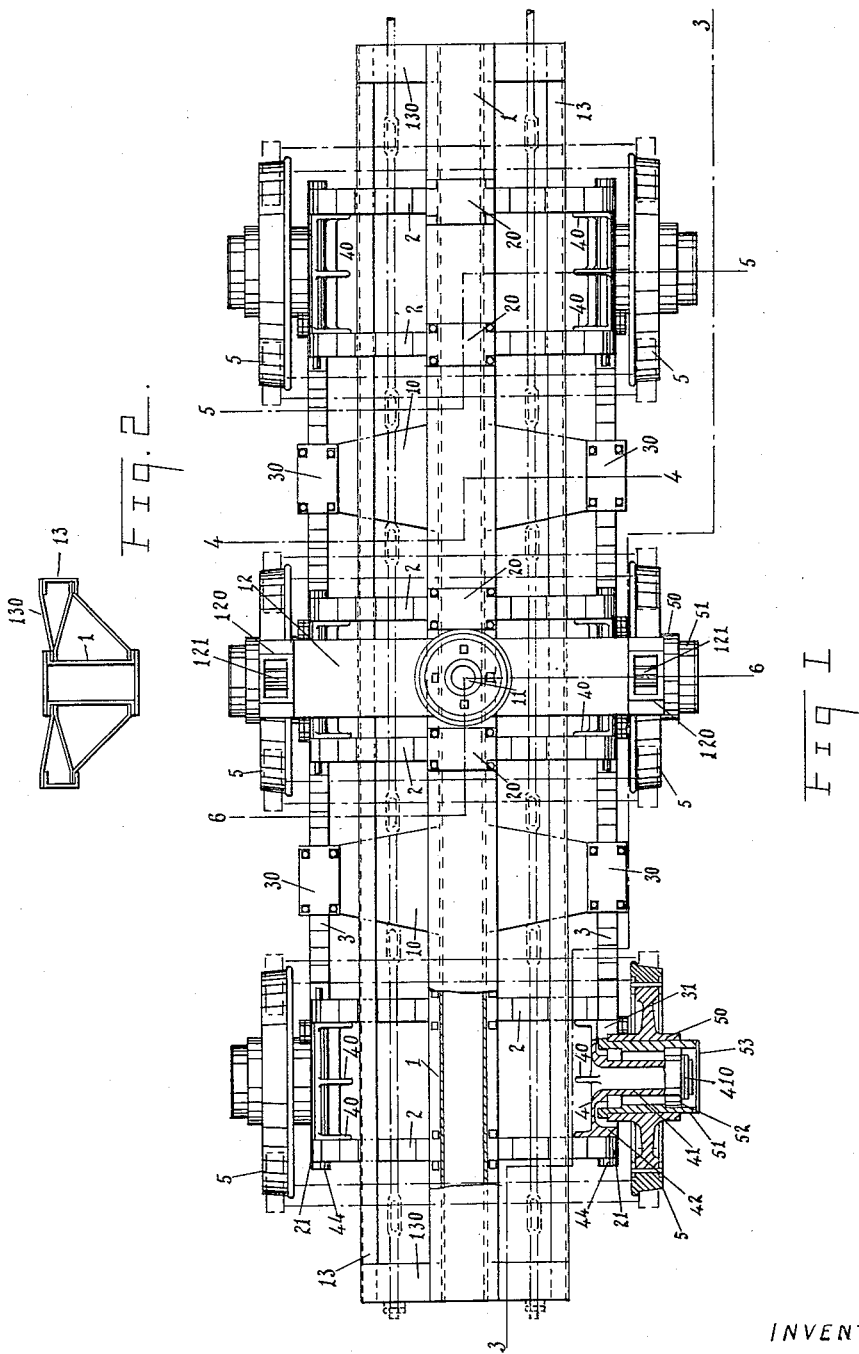
INVENTOR.
JAMES A. WRIGHT.
By
ATTORNEY.

Oct. 2, 1928.
J. A. WRIGHT
1,686,195
SPRING SUSPENSION
Filed Dec. 22, 1926
3 Sheets-Sheet 2
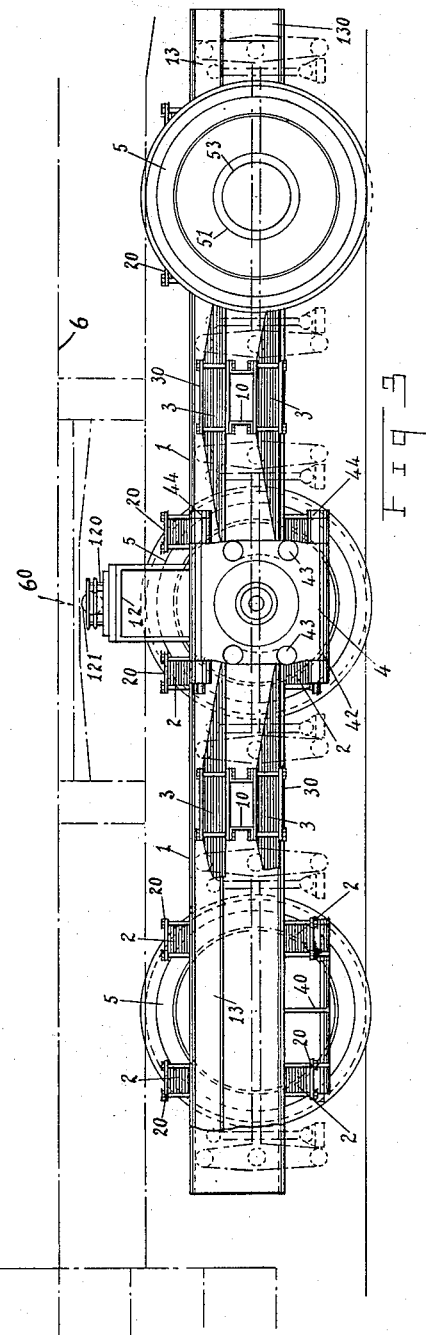
INVENTOR.
JAMES A. WRIGHT.
By
ATTORNEY.

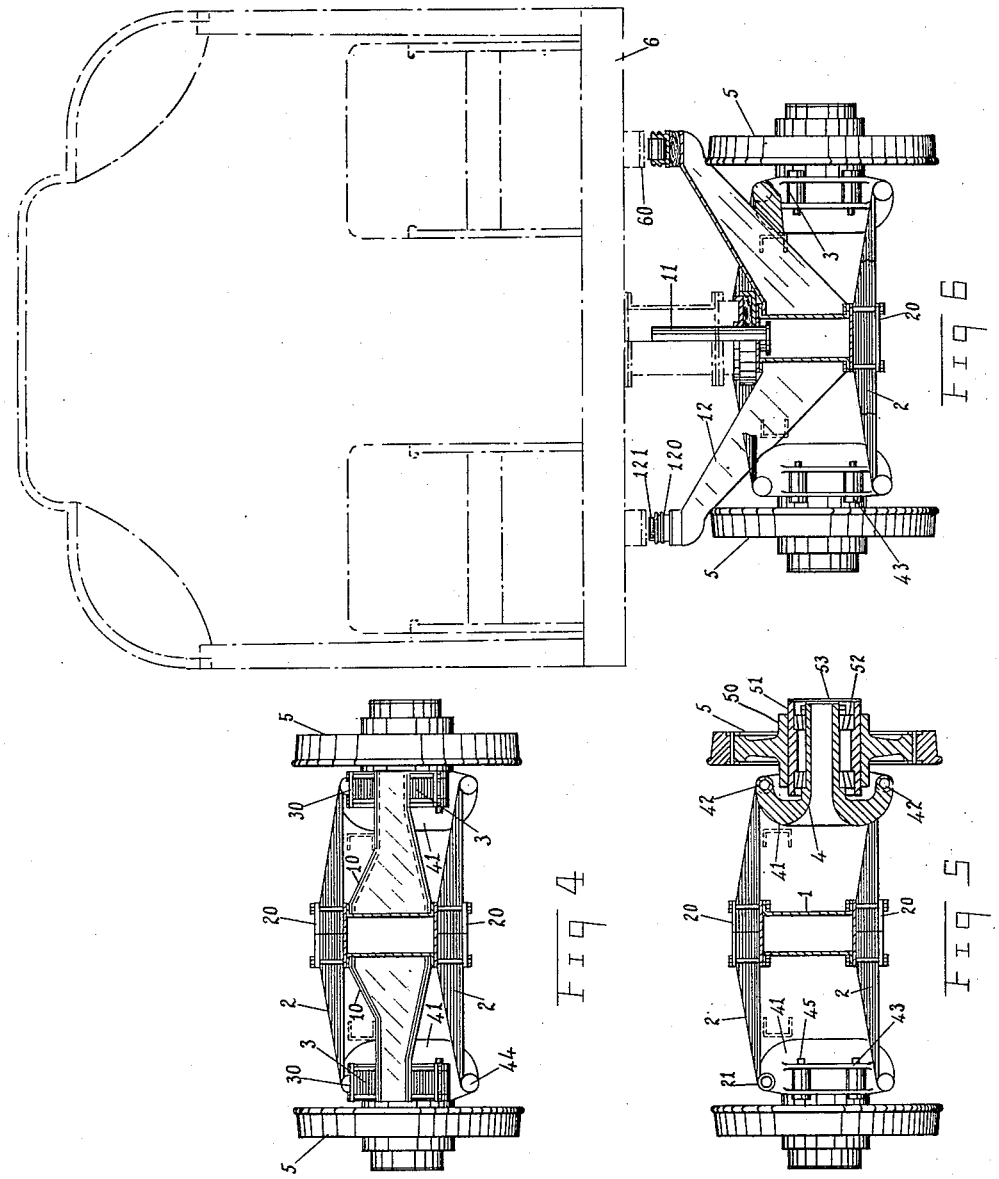

Patented Oct. 2, 1928.

1,686,195

UNITED STATES PATENT OFFICE.

JAMES A. WRIGHT, OF MONTREAL, QUEBEC, CANADA.

SPRING SUSPENSION.

Application filed December 22, 1926. Serial No. 156,506.

This invention relates to railway rolling stock and particularly to improvements in the spring suspension of the same on the wheels.

The object of the invention is to provide a spring suspension for rolling stock of greater inherent stability, more durable and safer in operation, simpler in fabrication, and more economical in construction than that hitherto employed.

A further object is to provide a system of spring suspension for rolling stock in which the conventional solid axle on which the wheels are mounted, with its journal boxes and equalizers is replaced by flexible axles, providing independent wheel action, whereby local stresses are distributed and absorbed and wheel slippage when rounding curves is entirely eliminated.

A further object is to provide a system of spring suspension whereby the independent wheels are maintained vertical to the rails and parallel to the truck frame, under every variety of stresses to which the wheels, the truck and the car body may be subjected.

A further object is to provide a system of spring suspension for rolling stock consisting entirely of an arrangement of pairs of parallel springs, one above the other.

A further object is to provide a system of spring suspension, in which the unsprung weight in the truck is reduced to a minimum, whereby the injurious and destructive effects of high inertia forces and of friction are largely eliminated and the wear and tear on the truck structure and road bed are greatly reduced.

A further object is to provide a spring suspension which rapidly absorbs and dissipates all torsional, inertia and load stresses and equalizes and centralizes all stresses due to road weaves and irregularities of the road bed.

A further object is to provide a spring suspension in which the load is borne by the flexible ends of the springs whereby more rapid spring action is obtained and friction between the parts of the structure is practically eliminated.

Other objects will be set forth in the specification hereinafter.

In order to clearly set forth one manner in which the invention may be applied, a six wheel bogie truck is shown and described hereinafter but the scope of the invention is not to be limited to this form of application.

Reference is made to the accompanying drawings in which:—

Fig. 1 is a plan view of the truck partly in section.

Fig. 2 is an end view showing the stem and brake frame.

Fig. 3 is a vertical longitudinal section on the line 3—3 in Fig. 1.

Fig. 4 is a vertical cross section on the line 4—4 of Fig. 1.

Fig. 5 is a vertical cross section on the line 5—5 of Fig. 1.

Fig. 6 is a vertical cross section on the line 6—6 of Fig. 1.

In the device as shown in the drawings the central stem 1, is preferably a box girder extending the full length of the truck, having the king pin 11, projecting upwardly in its center.

On either side of the king pin 11, and secured to the stem 1, are transverse brackets 12, projecting upwardly and provided at their outer ends with roller bearings 120, and rollers 121, journalled at right angles to the stem 1. The car body 6, is provided with plates 60, on its bottom above the rollers 121, to maintain the balance of the car body 6, on the truck about the king pin.

Between each pair of wheels 5, are one or more pairs of parallel semi-elliptic springs 2, secured at their centers to the top and bottom of the stem 1, by mountings 20.

As shown in Fig. 1, two pairs of springs parallel to the wheel axis are mounted on the stem 1.

These springs 2, are coupled at their outer ends to vertical wheel carriers 4, which are provided with outwardly projecting spindles 41, on which the wheels 5, are journalled.

As shown in Fig. 5 the stem 1, is suspended on independent wheels 5, through vertically parallel springs 2, and vertical wheel carriers 4, thereby providing flexible axles to the truck, which can only change their position vertically, relative to the position of the stem and car body.

This element composed of a stem 1, vertically parallel springs 2, 2, secured to the stem and a vertical wheel carrier 4, coupled to the ends of the springs 2, is the basic feature of the present invention. Its application in multiple will appear in the construction herein described.

Referring to Fig. 1 midway between the pairs of wheels 5, wide box brackets 10, which diminish in width and height towards their outer ends, project from the stem 1. The ends of these brackets have seats horizontally parallel on which are mounted vertically parallel pairs of semi-elliptic springs 3, by means of mountings 30, parallel to the stem 1.

The wheel carriers 4, have vertical ribs 40, extending inwardly and central spindles 41, projecting outwardly.

The spindles 41, support roller bearings 52, in sleeves 51, keyed to hubs 50, of the wheels 5. Caps 53, cover the ends of the sleeve 51.

The face of the wheel carrier 4, is rectangular as shown in the center of Fig. 3, and is provided with four corner bearings parallel to the face. On each side of the wheel carrier 4, are a pair of bearings 43, between the corner bearings and parallel to the spindle axis. As shown in Fig. 3, the corner bearings are provided by bolts 44, extending through the top and bottom of the wheel carrier 4.

The semi-elliptic springs are preferably provided with looped ends 21, 31. The looped ends 21, of the transverse springs 2, are mounted on the ends of the bolts 44, at the corners of the wheel carriers 4. The looped ends 31, of the springs 3, are mounted on pins 45, in the bearings 43, at the sides of the wheel carriers 4. The middle wheel carriers 4, are thus held in vertical position by eight springs, the end wheel carriers 4, are only held by six springs.

If found necessary, brackets similar to the brackets 10, may be provided at the ends of the stem 1, with springs mounted thereon parallel to the stem and coupled to the side bearings of the end wheel carriers.

The ends of the stem 1, have brackets 130, supporting the ends of the brake supporting bars 13.

Standard brake apparatus as shown in dotted lines in Figures 1 and 3, is supported on the bars 13.

With the construction of this description the suspension of the truck will comprise a central stem supported on six wheel carriers by means of twenty springs forming forty spring supports in pairs of vertically parallel springs. Twenty-four of these are transverse, direct from the stem, while sixteen are indirect, through the brackets and parallel to the stem.

This arrangement provides two complete planes of suspension made up of a series of rectangles, two sides of which are springs, the relation of the two planes being that each spring in one plane has a parallel spring in the other plane, with their ends rigidly connected.

This rectangle represents the basic element above referred to.

The wheel carriers which are connected to the flexible ends of these springs are always maintained parallel to the truck frame during their change in position relative to the frame, and this change of position can only be vertical. Each wheel is therefore free to act independently, while maintained parallel to the truck frame. Shocks caused by inequalities of the road bed are taken up without affecting the car body or creating stresses in the truck frame. Wheel slippage on curves of the rails is entirely eliminated.

The load of the car body and the trucks is distributed equally to the wheels by a multiplicity of springs which coact to provide a suspension unit, covering a wide area about the stem of the truck. Owing to the entire load being sustained on the flexible ends of the springs, rapid flexibility is available and smooth running is obtainable. Furthermore the danger from the rupture of any spring is reduced to a minimum and greater safety from accident is secured.

The system of suspension also reduces the unsprung weight of the truck to a minimum, the only unsprung weight of the entire truck being the wheel carriers and the wheels. The destructive effect of unsprung weight on rails, road bed, wheels and truck structure, now so considerable will be cut down to a great extent, and the adoption of the invention will benefit the upkeep of such equipment accordingly.

As a result of the inherent stability of this method of suspension, the tendency of the car body to side sway will be greatly reduced and steadier and more comfortable riding will be possible. The car body will be maintained in a vertical position parallel to the wheel contact on the rails, thereby providing against the risk of overturning to an extent hitherto unknown. This coupled with the tendency of the independent wheels to remain in contact with the rail will secure greater safety in operation under all conditions.

By means of the centralization in the stem of the stresses due to torsional and inertia forces, the elaborate subdivision and distribution of the load stresses, the elimination of unsprung weight and its effects, and the rapid absorption of the road stresses, the rolling stock will be relieved of a large amount of wear and tear on its parts, and a longer and more efficient life will result.

From the simplicity of the construction and absence of complicated parts, as well as from uniformity in design of the elements comprised in the suspension, great economy in the fabrication, and assembly of the device as well as in its upkeep and replacement will be obtained.

What I claim is:—

1. In the spring suspension of rolling stock, a plurality of spring elements, each element having a pair of parallel springs mounted one above the other, between the frame and the independent wheels.

2. In the spring suspension of rolling stock, the combination of a central stem supporting the load, independent wheels journalled on wheel carriers with pairs of transverse parallel springs mounted on the stem, one above the other, and coupled to the wheel carriers at their flexible ends.

3. In the spring suspension of rolling stock, the combination of a central load supporting stem, and independent wheels journalled on wheel carriers, with a plurality of semi-elliptic springs mounted transversely on the stem in pairs, one above the other, and coupled at their ends to the wheel carriers.

4. In the spring suspension of rolling stock, the combination of a central load supporting stem, a car body pivoted thereon, and independent wheels, journalled on spindles projecting from wheel carriers, with a plurality of transverse springs in parallel pairs, one above the other, connecting the wheel carriers to the stem.

5. In the spring suspension of rolling stock, the combination of a load supporting central stem, a car body pivoted thereon and a series of semi-elliptic springs mounted transversely on the stem in pairs, one above and the other below the stem, with independent wheels journalled on wheel carriers, having the wheel carriers coupled to the ends of the springs.

6. In the spring suspension of rolling stock, the combination of a load supporting central stem, a car body pivoted thereto, transverse brackets projecting therefrom, and a series of semi-elliptic springs mounted transversely on the stem and longitudinally on the ends of the brackets, in parallel pairs, one above the other, with independent wheels journalled on wheel carriers, having the wheel carriers coupled to the ends of the springs.

7. In the spring suspension of rolling stock, the combination of a load supporting central stem, a car body pivoted thereon, and independent wheels journalled on wheel carriers, with a plurality of semi-elliptic springs in two planes, having parallel springs in each plane connecting the stem to the wheel carriers.

8. In the spring suspension of rolling stock, a plurality of elements combined to form a load supporting device, each element comprising a rectangle in a vertical plane, having upper and lower parallel spring members, connected by rigid members forming the sides.

9. In the spring suspension of rolling stock providing independent wheels, comprising, a load supporting stem, wheel carriers on which the wheels are journalled, and an independent spring connection between each wheel carrier and the stem.

10. In the spring suspension of rolling stock providing independent wheels, comprising, a load supporting stem, wheel carriers on which the wheels are journalled, and a series of semi-elliptic springs in parallel pairs, one above the other, connecting each wheel carrier independently to the stem.

11. In a bogie truck, the combination of a central stem with a plurality of wheel carriers on which the independent wheels are journalled, and a series of parallel semi-elliptic springs supporting the stem on the wheel carriers.

12. In a bogie truck, the combination of a central stem having transverse brackets thereto, with a plurality of wheel carriers on which the wheels are journalled and a series of semi-elliptic springs in parallel pairs, supporting the stem and the brackets on the wheel carriers.

13. In a bogie truck the combination of a central stem having transverse brackets thereto, with a plurality of wheel carriers on which the wheels are journalled, and a series of semi-elliptic springs in parallel pairs secured at their centers to the stem and the brackets and at their ends to the wheel carriers.

14. In a bogie truck, the combination of a central stem with a plurality of independent wheels on independent journals, and a series of springs in parallel pairs connecting the stem to journals.

15. In a bogie truck, the combination of a central stem having transverse brackets thereto, with a plurality of wheels on independent journals, and a series of springs in parallel pairs connecting the stem and the brackets to the journals.

16. In a bogie truck, the combination of a central stem with a plurality of wheel carriers, having spindles projecting therefrom on which the wheels are journalled, and a series of transverse springs secured at their centers to the stem and at their ends to the wheel carriers.

17. In a bogie truck, the combination of a central stem with a plurality of wheel carriers, having spindles projecting therefrom, on which the wheels are journalled and a series of transverse springs in parallel pairs secured at their centers to the stem and at their ends to the wheel carriers.

18. In a bogie truck, the combination of a central stem with a plurality of wheel carriers having spindles projecting therefrom, on which the wheels are journalled, and a series of transverse springs in parallel pairs, secured at their centers to the stem and spaced apart to provide four spring ends for each wheel carrier, to the upper and lower corners of which they are secured.

19. In a bogie truck, the combination of a central stem having transverse brackets thereto, with a plurality of wheel carriers having spindles projecting therefrom, on which the wheels are journalled, and a series of transverse springs in parallel pairs, secured at their centers to the stem and spaced apart to provide four spring ends for each wheel carrier, to the upper and lower corners of which they are secured and a series of longitudinal springs in parallel pairs, secured at their centers above and below the ends of the brackets and at their ends to the sides of the wheel carriers.

20. In a bogie truck, the combination of a central stem having a body supporting central transverse bracket on either side of the kingpin, and transverse spring carrying brackets between each pair of wheels, and end brackets to which the brake control frame is secured, with a plurality of wheels journalled on independent wheel carriers, and a series of transverse and longitudinal springs, in parallel pairs, secured at their centers to the stem and the transverse brackets and at their ends to the wheel carriers.

JAMES A. WRIGHT.